(12) United States Patent
Palanivelu et al.

(10) Patent No.: US 8,953,706 B1
(45) Date of Patent: *Feb. 10, 2015

(54) METHOD FOR COMPUTING SUB-STREAM INVARIANT STEERING MATRICES FOR MIMO BEAMFORMING

(71) Applicant: Marvell International Ltd., Hamilton (BM)

(72) Inventors: Arul Durai Murugan Palanivelu, Sunnyvale, CA (US); Hongyuan Zhang, Fremont, CA (US); Swaroop Venkatesh, Dublin, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/259,596

(22) Filed: Apr. 23, 2014

Related U.S. Application Data

(63) Continuation of application No. 13/730,393, filed on Dec. 28, 2012, now Pat. No. 8,718,176, which is a continuation of application No. 12/625,231, filed on Nov. 24, 2009, now Pat. No. 8,345,797.

(60) Provisional application No. 61/119,910, filed on Dec. 4, 2008.

(51) Int. Cl.
*H04L 27/00* (2006.01)
*H04B 7/02* (2006.01)
*H04B 7/04* (2006.01)

(52) U.S. Cl.
CPC .................................. *H04B 7/0456* (2013.01)
USPC .......................................... 375/295; 375/267

(58) Field of Classification Search
CPC ................... H04L 2025/03426; H04L 1/0009; H04L 7/0617; H04L 1/0003; H04L 27/2626; H04L 25/03343; H04B 7/0608; H04B 7/0408; H04B 7/0456
USPC ............ 375/260, 265, 267, 295, 299; 455/24, 455/500, 68–69, 88, 101
See application file for complete search history.

(56) References Cited

U.S. PATENT DOCUMENTS 7,302,009 B2 11/2007 Walton et al.
7,787,554 B1 8/2010 Nabar et al.

(Continued)

OTHER PUBLICATIONS

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).

(Continued)

*Primary Examiner* — Khanh C Tran

(57) ABSTRACT

In a method for generating steering matrices for beamforming, one or more subsets of one or more maximum transmit steering matrices are selected, where the maximum transmit steering matrices correspond to a maximum number of spatial streams able to be transmitted from a transmitter to a receiver. The subsets correspond to an actual number of spatial streams to be transmitted, and the subsets are applied to spatial streams to be transmitted. In an apparatus for generating steering matrices, a steering matrix calculator is configured to determine, from maximum transmit steering matrices, a plurality of steering coefficients corresponding to an actual number of spatial streams.

21 Claims, 5 Drawing Sheets

(56) References Cited

U.S. PATENT DOCUMENTS

| | | | |
|---|---|---|---|
| 7,961,809 B2 * | 6/2011 | Bourdoux et al. | 375/295 |
| 8,064,835 B2 | 11/2011 | Rezvani et al. | |
| 8,175,181 B1 * | 5/2012 | Nabar et al. | 375/267 |
| 8,290,539 B2 * | 10/2012 | Li et al. | 455/562.1 |
| 8,306,089 B2 * | 11/2012 | Merlin et al. | 375/135 |
| 8,374,275 B2 * | 2/2013 | Yu et al. | 375/267 |
| 8,442,138 B2 | 5/2013 | Zhang et al. | |
| 8,494,084 B1 | 7/2013 | Nabar et al. | |
| 2005/0175115 A1 | 8/2005 | Walton et al. | |
| 2008/0266176 A1 | 10/2008 | Nabar et al. | |
| 2010/0027702 A1 * | 2/2010 | Vijayan et al. | 375/267 |

OTHER PUBLICATIONS

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 Ghz Band," *The Institute of Electrical and Electronics Engineers, Inc.*, (1999).

IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks-Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.

S. A. Mujtaba, "IEEE P802.11—Wireless LANs, TGn Sync Proposal Technical Specification," *The Institute of Electrical and Electronics Engineers, Inc.*, doc.: IEEE 802.11—04/0889r6, May 2005.

IEEE Std 802.16e-2005 and IEEE Std 802.16/2004/Cor1-2005 (Amendment and Corrigendum to IEEE Std 802.16-2004), IEEE Standard for Local and metropolitan area networks: Part 16: Air Interface for Fixed and Mobile Broadband Wireless Access Systems: Amendment 2: Physical and Medium Access Control Layers for Combined Fixed and Mobile Operation in Licensed Bands and Corrigendum 1, The Institute of Electrical and Electronics Engineers, Inc., Feb. 28, 2006.

IEEE Std 802.16a-2003 (Amendment to IEEE Std 802.16-2001) "IEEE Standard for Local and metropolitan area networks: Part 16: Air Interface for Fixed Broadband Wireless Access Systems-Amendment 2: Medium Access Control Modifications and Additional Physical Layer Specifications for 2-11 GHZ," *The Institute of Electrical and Electronics Engineers, Inc.*, Apr. 1, 2003.

* cited by examiner

METHOD FOR COMPUTING SUB-STREAM INVARIANT STEERING MATRICES FOR MIMO BEAMFORMING

CROSS-REFERENCES TO RELATED APPLICATIONS

The present application is a continuation of and claims priority to U.S. application Ser. No. 13/730,393, entitled "Method for Computing Sub-Stream Invariant Steering Matrices for MIMO Beamforming" and filed on Dec. 28, 2012, which is a continuation of and claims priority to U.S. application Ser. No. 12/625,231, entitled "Method and Apparatus for Generating Steering Matrices for Beamforming" and filed on Nov. 24, 2009, now U.S. Pat. No. 8,345,797, which claims the benefit of and priority to U.S. Provisional Application No. 61/119,910, entitled "A Method for Computing Sub-Stream Invariant Steering Matrices for MIMO Beamforming," filed on Dec. 4, 2008, the entire disclosures of which are hereby expressly incorporated by reference herein.

FIELD OF TECHNOLOGY

The present disclosure relates generally to wireless communication systems and, more particularly, to performing transmit beamforming with multiple antennas.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An ever-increasing number of relatively cheap, low power wireless data communication services, networks and devices have been made available over the past number of years, promising near wire speed transmission and reliability. Various wireless technology is described in detail in the IEEE 802.11 Standard, including for example, the IEEE 802.11a (1999) Standard and its updates and amendments, the IEEE 802.11g (2003) Standard, as well as the IEEE 802.11n Standard, all of which are collectively incorporated herein fully by reference. These standards have been or are in the process of being commercialized with the promise of 54 Mbps or more effective bandwidth, making them a strong competitor to traditional wired Ethernet and the more ubiquitous "802.11b" or "WiFi" 11 Mbps mobile wireless transmission standard.

Generally speaking, transmission systems compliant with the IEEE 802.11a and 802.11g Standards or "802.11a/g" as well as the IEEE 802.11n Standard achieve their high data transmission rates using Orthogonal Frequency Division Modulation or OFDM encoded symbols mapped up to a 64 quadrature amplitude modulation (QAM) multi-carrier constellation. Generally speaking, the use of OFDM divides the overall system bandwidth into a number of frequency sub-bands or channels, with each frequency sub-band being associated with a respective sub-carrier or tone upon which data may be modulated. Thus, each frequency sub-band of the OFDM system may be viewed as an independent transmission channel within which to send data, thereby increasing the overall throughput or transmission rate of the communication system.

Generally, transmitters used in the wireless communication systems that are compliant with the aforementioned IEEE 802.11a/802.11g/802.11n Standards as well as other standards such as the IEEE 802.16a/e/j/m Standard, perform multi-carrier OFDM symbol encoding (which may include error correction encoding and interleaving), convert the encoded symbols into the time domain using Inverse Fast Fourier Transform (IFFT) techniques, and perform digital to analog conversion and conventional radio frequency (RF) upconversion on the signals. These transmitters then transmit the modulated and upconverted signals after appropriate power amplification to one or more receivers, resulting in a relatively high-speed time domain signal with a large peak-to-average ratio (PAR).

Likewise, the receivers used in the wireless communication systems that are compliant with the aforementioned IEEE 802.11a/802.11g/802.11n Standards and the IEEE 802.16a/e/j/m Standards generally include an RF receiving unit that performs RF downconversion and filtering of the received signals (which may be performed in one or more stages), and a baseband processor unit that processes the OFDM encoded symbols bearing the data of interest. Generally, the digital form of each OFDM symbol presented in the frequency domain is recovered after baseband downconversion, conventional analog to digital conversion and Fast Fourier Transformation of the received time domain analog signal. Thereafter, the baseband processor performs frequency domain equalization (FEQ) and demodulation to recover the transmitted symbols. The recovered and recognized stream of symbols is then decoded, which may include deinterleaving and error correction using any of a number of known error correction techniques, to produce a set of recovered signals corresponding to the original signals transmitted by the transmitter.

Similarly, in a single carrier communication system, such as the IEEE 802.11b Standard, a transmitter performs symbol encoding (which may include error correction encoding and interleaving), digital to analog conversion and conventional radio frequency (RF) upconversion on the signals. These transmitters then transmit the modulated and upconverted signals after appropriate power amplification to one or more receivers. A receiver in a single carrier communication system includes an RF receiving unit that performs RF downconversion and filtering of the received signals (which may be performed in one or more stages), and a baseband processor unit that demodulates and decodes (which may include deinterleaving and error correction) the encoded symbols to produce a set of recovered signals corresponding to the original signals transmitted by the transmitter.

In wireless communication systems, the RF modulated signals generated by the transmitter may reach a particular receiver via a number of different propagation paths, the characteristics of which typically change over time due to the phenomena of multi-path and fading. Moreover, the characteristics of a propagation channel differ or vary based on the frequency of propagation. To compensate for the time varying, frequency selective nature of the propagation effects, and generally to enhance effective encoding and modulation in a wireless communication system, each receiver of the wireless communication system may periodically develop or collect channel state information (CSI) for each of the frequency channels, such as the channels associated with each of the OFDM sub-bands discussed above. Generally speaking, CSI is information defining or describing one or more characteristics about each of the OFDM channels (for example, the gain, the phase and the signal-to-noise ratio (SNR) of each channel). In a single carrier communication system, information similar to CSI information may be developed by the receiver. Upon determining the CSI for one or more channels, the receiver may send this CSI back to the transmitter, which may use the CSI for each channel to precondition the signals transmitted using that channel so as to compensate for the varying propagation effects of each of the channels.

An important part of a wireless communication system is therefore the selection of the appropriate data rates, and the coding and modulation schemes to be used for a data transmission based on channel conditions. Generally speaking, it is desirable to use the selection process to maximize throughput while meeting certain quality objectives, such as those defined by a desired frame error rate (FER), latency criteria, etc.

To further increase the number of signals which may be propagated in the communication system and/or to compensate for deleterious effects associated with the various propagation paths, and to thereby improve transmission performance, it is known to use multiple transmit and receive antennas within a wireless transmission system. Such a system is commonly referred to as a multiple-input, multiple-output (MIMO) wireless transmission system and is specifically provided for within the IEEE 802.11n Standard. Generally speaking, the use of MIMO technology produces significant increases in spectral efficiency and link reliability, and these benefits generally increase as the numbers of transmit and receive antennas within the MIMO system increases.

In addition to the frequency channels created by the use of OFDM, for example, a MIMO channel formed by the various transmit and receive antennas between a particular transmitter and a particular receiver includes a number of independent spatial channels. As is known, a wireless MIMO communication system can provide improved performance (e.g., increased transmission capacity) by utilizing the additional dimensionalities created by these spatial channels for the transmission of additional data. Of course, the spatial channels of a wideband MIMO system may experience different channel conditions (e.g., different fading and multi-path effects) across the overall system bandwidth and may therefore achieve different SNRs at different frequencies (i.e., at the different OFDM frequency sub-bands) of the overall system bandwidth. Consequently, the number of information bits per modulation symbol (i.e., the data rate) that may be transmitted using the different frequency sub-bands of each spatial channel for a particular level of performance may differ from frequency sub-band to frequency sub-band.

However, instead of using the various different transmit and receive antennas to form separate spatial channels on which additional information is sent, better transmission and reception properties can be obtained in a MIMO system by using each of the various transmit antennas of the MIMO system to transmit the same signal while phasing (and amplifying) the signal as the signal is provided to the various transmit antennas to achieve beamforming, also sometimes referred to as beamsteering. Generally speaking, beamforming creates a spatial gain pattern having one or more high gain lobes or beams (as compared to the gain obtained by an omni-directional antenna) in one or more particular directions, while reducing the gain over that obtained by an omni-directional antenna in other directions. If the gain pattern is configured to produce a high gain lobe in the direction of each of the receiver antennas, the MIMO system can obtain better transmission reliability between a particular transmitter and a particular receiver, over that obtained by single transmitter-antenna/receiver-antenna systems.

There are many known techniques for determining a steering matrix specifying the beamforming coefficients that need to be used to properly condition the signals being applied to the various transmit antennas so as to produce the desired transmit gain pattern at the transmitter. As is known, these coefficients may specify the gain and phasing of the signals to be provided to the transmitter antennas to produce high gain lobes in particular or predetermined directions. These techniques include, for example, transmit-MRC (maximum ratio combining) and singular value decomposition (SVD).

An important part of determining the steering matrix is taking into account the specifics of the channel between the transmitter and the receiver, referred to herein as the forward channel. As a result, steering matrices are typically determined based on the CSI of the channel. To determine the CSI or other specifics of a forward channel, the transmitter may first send a known test or calibration signal to the receiver. The receiver may then compute or determine the specifics of the forward channel (e.g., the CSI for the forward channel), and may send the CSI or other indications of the forward channel back to the transmitter, thereby requiring signals to be sent both from the transmitter to the receiver and then from the receiver back to the transmitter in order to perform beamforming in the forward channel. This exchange typically may occur each time the forward channel is determined (e.g., each time a steering matrix is to be calculated for the forward channel).

Determining a steering matrix based on the CSI (or other information) of the forward channel using the process described above is often referred to as explicit beamforming. To reduce the amount of startup exchanges required to perform explicit beamforming, it is known to perform another process often referred to as implicit beamforming. With implicit beamforming, the steering matrix is calculated or determined based on the assumption that the forward channel (i.e., the channel from the transmitter to the receiver in which beamforming is to be accomplished) can be estimated from the reverse channel (i.e., the channel from the receiver to the transmitter). In particular, the forward channel can ideally be estimated as the matrix transpose of the reverse channel matrix. Thus, in the ideal case, the transmitter only needs to receive signals from the receiver to produce a steering matrix for the forward channel, as the transmitter can use the signals from the receiver to determine the reverse channel, and can simply estimate the forward channel as a matrix transpose of the reverse channel matrix. As a result, implicit beamforming reduces the amount of startup exchange signals that need to be sent between a transmitter and a receiver because the transmitter can estimate the forward channel based solely on signals sent from the receiver to the transmitter.

Either explicit or implicit beamforming may be used to determine a steering matrix or multiple steering matrices. In an OFDM system, each sub-carrier or tone (or each of a plurality of groups of sub-carriers or tones) may have an associated steering matrix. The multiple steering matrices in the OFDM system may be used by the system to determine output power levels for power amplifiers (PAs) in an attempt to operate corresponding transmit antennas at a maximized power while simultaneously minimizing distortion. Typically, the system may vary the energy of an input to a PA and/or adjust an output power level of the PA based on an average calculated power for the transmit antenna. Unfortunately, this averaging approach may result in distortion or performance loss due to nonlinearity at the power amplifier associated with the transmit antenna.

Moreover, in some instances, such as when the system transitions to using a different modulation coding scheme with a different number of spatial streams, the power adjustments must be re-calculated as the total calculated power for each transmit antenna may change. This re-calculation is computationally expensive.

SUMMARY

In one embodiment, a method includes selecting one or more subsets of one or more maximum transmit steering matrices. The one or more maximum transmit steering matrices correspond to a maximum number of spatial streams able to be transmitted by a transmitter to a receiver, and the one or more subsets of the maximum transmit steering matrices correspond to an actual number of spatial streams to be transmitted. The method also includes applying the one or more subsets of the maximum transmit steering matrices to spatial streams to be transmitted.

In another embodiment, an apparatus comprises a steering matrix calculator configured to determine a plurality of steering coefficients corresponding to an actual number of spatial streams to be transmitted by a transmitter by selecting one or more subsets of steering coefficients from one or more transmit steering matrices corresponding to a maximum number of spatial streams able to be transmitted by the transmitter.

In yet another embodiment, a method includes generating one or more transmit steering matrices corresponding to a maximum number of spatial streams able to transmitted by a transmitter to a receiver, and generating a plurality of scaling factors for spatial stream/transmit antenna pairs. The method additionally includes scaling the one or more transmit steering matrices using the scaling factors to form one or more spatial stream invariant steering matrices.

DETAILED DESCRIPTION

While the steering matrix generation techniques described herein for effecting a wireless data transmission are described as being used in communication systems that operate according to one or more protocols from the IEEE 802.11 family of standards, techniques such as described herein may be used in various other types of wireless communication systems and are not limited to those conforming to the IEEE 802.11 family of standards. As just two examples, steering matrix generation techniques such as described herein may be used in systems that operate according to one or more protocols from the IEEE 802.16 family of standards or in systems that use code division multiple access (CDMA) modulation.

Figure 1:
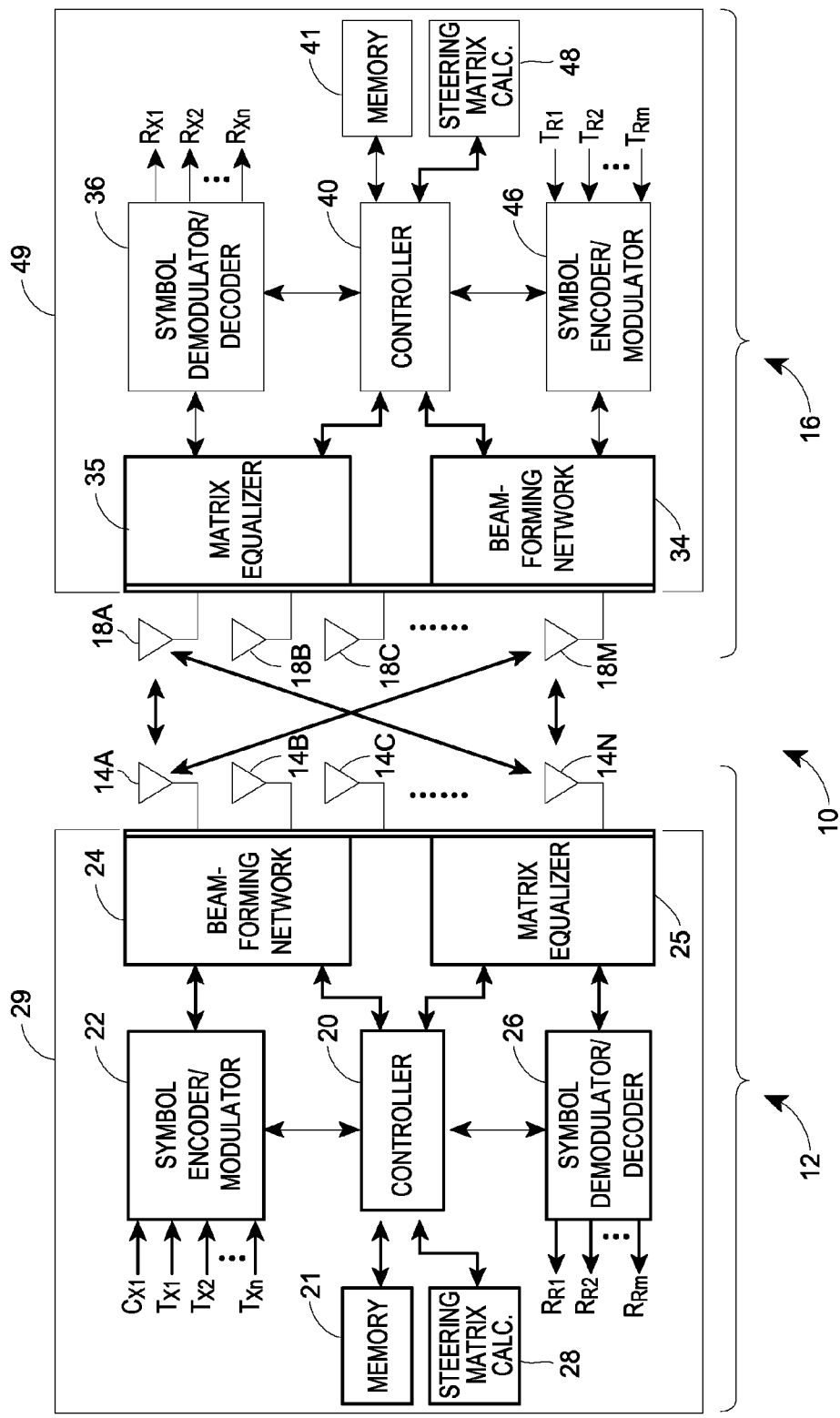
FIG. 1 is a block diagram of a wireless MIMO communication or transmission system that implements transmit beamforming and that may utilize power amplifier control techniques such as described herein.

Referring now to FIG. 1, a MIMO communication system 10 is illustrated in block diagram form as generally including a single transmitter 12 having multiple transmitter antennas 14A-14N and a single receiver 16 having multiple receiver antennas 18A-18M. The number of transmitter antennas 14A-14N can be the same as, more than, or less than the number of receiver antennas 18A-18M. As shown in FIG. 1, the transmitter 12 may include a controller 20 coupled to a memory 21, a symbol encoder and modulator unit 22 and a beamforming network 24, also referred to herein as a transmit beamforming network. The transmitter 12 may also include a matrix equalizer 25 and a symbol demodulator and decoder unit 26 to perform demodulation and decoding of signals received via the antennas 14A-14N in a receive mode.

Additionally, the transmitter 12 includes a steering matrix calculation unit 28. The steering matrix calculation unit 28 generates steering matrices for transmit and/or receive beamforming applied by the beamforming network 24. The steering matrix calculation unit 28 may utilize techniques for generating transmit steering matrices described subsequently. Additionally, the beamforming network may apply steering matrices using techniques described subsequently.

The controller 12 may be any desired type of controller and both the controller 12 and the steering matrix calculation unit 28 may be implemented as one or more multi-purpose, programmable processors, such as micro-processors, as application specific integrated circuits (ASICs), etc., or may be implemented using any other desired types of hardware, a processor executing software and/or firmware instructions, or combinations thereof. Likewise, the beamforming network 24 and the matrix equalizer 25 may be implemented using hardware, a processor executing software and/or firmware, or combinations thereof. If desired, various of the transmitter components, such as the controller 20, the modulator unit 22, the demodulator unit 26, the steering matrix calculation unit 28, the beamforming network 24 and the matrix equalizer 25 may be implemented in the same or in different hardware devices, such as in the same or different processors. Additionally, each of these components of the transmitter 12 may be disposed in a housing 29 (shown in dotted relief in FIG. 1). Still further, the software/firmware routines or instructions for implementing the functionality of any of these components may be stored in the memory 21 or within other memory devices associated with the individual hardware used to implement these components.

During operation, information signals $T_{x1}$-$T_{xn}$ which are to be transmitted from the transmitter 12 to the receiver 16 are provided to the symbol encoder and modulator unit 22 for encoding and modulation. Of course, any desired number of signals $T_{x1}$-$T_{xn}$ may be provided to the modulator unit 22, with this number generally being limited by the modulation scheme used by and the bandwidth associated with the MIMO communication system 10. Additionally, the signals $T_{x1}$-$T_{xn}$ may be any type of signals, including analog or digital signals, and may represent any desired type of data or information. Additionally, if desired, a known test or control signal $C_{x1}$ (which may be stored in the memory 21) may be provided to the symbol encoder and modulator unit 22 for use in determining CSI related information describing the characteristics of the channel(s) between the transmitter 12 and the receiver 16, e.g., a sounding process. If desired, the same control signal or a different control signal may be used to determine the CSI for each frequency and/or spatial channel used in the MIMO communication system 10. The control signal $C_{x1}$ may be contained within a sounding packet, for example.

The symbol encoder and modulator unit 22 may interleave digital representations of the various signals $T_{x1}$-$T_{xn}$ and $C_{x1}$ and may perform any other known type(s) of error-correction encoding on the signals $T_{x1}$-$T_{xn}$ and $C_{x1}$ to produce one or more streams of symbols to be modulated and sent from the transmitter 12 to the receiver 16. While the symbols may be modulated using any desired or suitable QAM technique, such as using 64 QAM, these symbols may be modulated in any other known or desired manner including, for example, using any other desired phase and/or frequency modulation techniques. In any event, the modulated symbol streams are provided by the symbol encoder and modulator unit 22 to the beamforming network 24 for processing before being transmitted via the antennas 14A-14N. While not specifically shown in FIG. 1, the modulated symbol streams may be up-converted to the RF carrier frequencies associated with an OFDM technique (in one or more stages) before being processed by the beamforming network 24 in accordance with a beamforming technique more specifically described herein. Additionally, while also not specifically shown in FIG. 1, the modulated symbol streams may be spatially parsed into a desired number of spatial streams, where the desired number of spatial streams is less than or equal to a maximum number of possible spatial streams able to be transmitted between the transmitter 12 and the receiver 16. As commonly known in the art, modulation, up-conversion and spatial parsing of the symbol streams may be performed in any order.

Upon receiving the modulated (and, optionally, up-converted and/or spatially parsed) signals, the beamforming network 24 processes the modulated signals by injecting delays and/or gains into the modulated signals based on a steering matrix provided by the controller 20 and/or the steering matrix calculation block, to thereby perform beamforming via the transmitter antennas 14A-14N.

The signals transmitted by the transmitter 12 are detected by the receiver antennas 18A-18M and may be processed by a matrix equalizer 35 within the receiver 16 to enhance the reception capabilities of the antennas 18A-18M. As will be understood, the processing applied at the receiver 16 (as well as at the transmitter 12) may be based on, for example, the CSI developed by the receiver 16 in response to the transmission of a test or control signal $C_{x1}$ (e.g., a sounding packet). In any event, a symbol demodulator and decoder unit 36, under control of a controller 40, may decode and demodulate the received symbols as processed by the matrix equalizer 35. In this process, these signals may be downconverted to baseband. Generally, the matrix equalizer 35 and the demodulator and decoder unit 36 may operate to remove effects of the channel based on the CSI as well as to perform demodulation on the received symbols to produce a digital bit stream. In some cases, if desired, the symbol demodulator and decoder unit 36 may perform error correction decoding and deinterleaving on the bit stream to produce the received signals $R_{x1}$-$R_{xn}$ corresponding to the originally transmitted signals $T_{x1}$-$T_{xn}$.

As shown in FIG. 1, the receiver 16 may also include a memory 41 and a symbol encoder and modulator unit 46 which may receive one or more signals $T_{R1}$-$T_{Rm}$ which may be encoded and modulated using any desired encoding and modulation techniques. The encoded and modulated symbol stream may then be upconverted and processed by a beamforming network 24 to perform beamforming based on a steering matrix developed by a steering matrix calculation unit 48, prior to being transmitted via the receiver antennas 18A-18N to, for example, the transmitter 12, thereby implementing the reverse link. As shown in FIG. 1, each of the receiver components may be disposed in a housing 49.

The matrix equalizer 25 and the demodulator/decoder unit 26 within the transmitter 12 operate similarly to the matrix equalizer 35 and the demodulator/decoder unit 36 of the receiver 16 to demodulate and decode the signals transmitted by the receiver 16 to produce the recovered signals $R_{R1}$-$R_{Rm}$. Here again, the matrix equalizer 25 may process the received signals in any known manner to enhance the separation and therefore the reception of the various signals transmitted by the antennas 18A-18M. Of course, the CSI for the various OFDM channel(s) may be used by the steering matrix calculation units 28 and 48 as well as by the controllers 20 and 40 to perform beamforming and to determine a steering matrix used by the beamforming networks 24, 34. As noted above, the CSI, beamforming and other programs and data such as the steering matrix used by the units 28 and 48 and by the controllers 20 and 40 may be stored in the memories 21 and 41.

As is generally known, beamforming typically includes applying appropriate phases and gains to the various signals as sent through the multiple transmitter antennas 14A-14N, in a manner which causes the signals sent from the different transmitter antennas 14A-14N to constructively interact (add in phase) in certain predetermined directions and to deconstructively interact (cancel) in other directions. Thus, beamforming typically produces a beam pattern having high gain regions (referred to as high gain lobes) in various predetermined directions and low gain regions (typically referred to as nulls) in other directions. The use of beamforming techniques in a MIMO system enables a signal to be sent with high gain (as compared to an omni-directional antenna) in certain directions, and to be sent with low gain (as compared to an omni-directional antenna) in other directions. Thus, in the MIMO system 10 of FIG. 1, beamforming may be used to enhance signal directivity towards the receiver antennas 18A-18M, which improves the SNR of the transmissions and results in more reliable transmissions. In this case, the beamforming techniques will generally form high gain lobes in the direction of propagation at which the highest gain is desired, and in particular in the directions of propagation from the transmitter 12 to each of the receiver antennas 18A-18M of the receiver 16.

To implement beamforming in the transmitter 12, the steering matrix calculation unit 28 may determine or calculate a set of matrix coefficients (referred to herein as a steering matrix) which are used by the beamforming network 24 to condition the signals being transmitted by the antennas 14A-14N. In multi-carrier systems such as OFDM systems, if desired, the steering matrix for any particular sub-carrier of the MIMO system 10 may be determined by the steering matrix calculation unit 28 based on the CSI determined for that sub-carrier (wherein the CSI is usually developed by and sent from the receiver 16 but may instead be developed from signals sent from the receiver 16 to the transmitter 12 in the reverse link as an estimate of the forward link).

Figure 2:
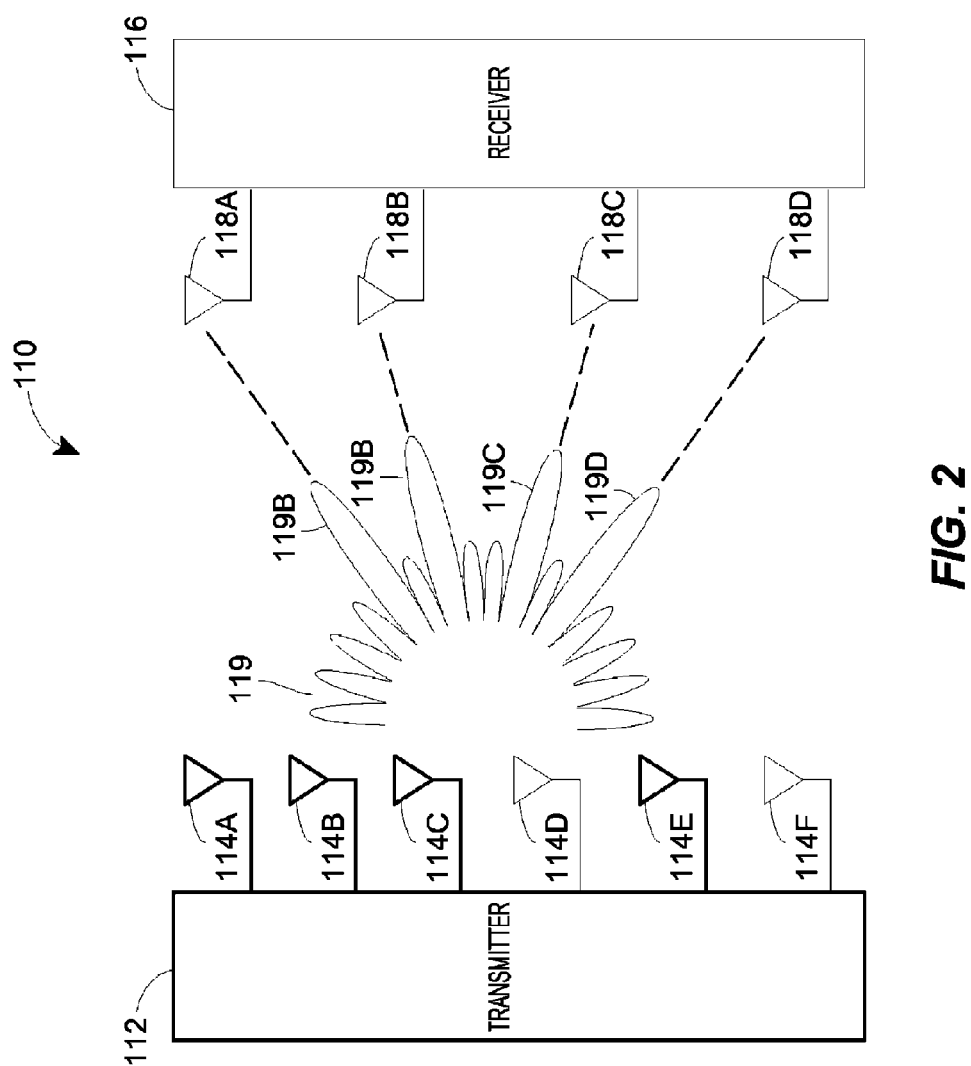
FIG. 2 is a block diagram illustrating a transmit gain pattern for wireless communications between a single transmitter and a single receiver implemented using transmit beamforming.

To illustrate an example of traditional beamforming, FIG. 2 shows a MIMO communication system 110 having a single transmitter 112 with six transmitter antennas 114A-114F, and a single receiver 116 with four receiver antennas 118A-118D. In this example, the steering matrix may be developed by the transmitter 112 or the receiver 116, using explicit beamforming or implicit beamforming methods. As illustrated in FIG. 2, the transmit gain pattern 119 includes multiple high gain lobes 119A-119D disposed in the directions of the receiver antennas 118A-118D. The high gain lobes 119A-119D are orientated in the directions of propagation from the transmitter 112 to the particular receiver antennas 118A-118D while lower gain regions, which may even include one or more nulls, are produced in other directions of propagation. While FIG. 2 illustrates a separate high gain lobe directed to each of the receiver antennas 118A-118D, it will be understood that the actual gain pattern produced by the steering matrix calculations may not necessarily include a separate high gain lobe for each of the receiver antennas 118A-118D. Instead, the gain pattern produced by the steering matrix calculations for the transmitter 112 may have a single high gain lobe covering or directed generally to more than one of the receiver antennas 118A-118D. Thus, it is to be understood that the beam pattern resulting from the creation of a steering matrix may or may not have separate high gain lobes separated by low gain regions or nulls for each of the receiver antennas.

Of course, developing the beam pattern 119 to have high gain regions and low gain regions may be performed in any desired manner and location. For example, any of the components within the transmitter 12 or within the receiver 16 of FIG. 1, including the controllers 20, 40 and the steering matrix calculation units 28, 48 may generate and/or process the steering information. For example, the controller 20 or the steering matrix calculation unit 28 within the transmitter 12 may determine the steering matrix for use in the beamforming network 24 for performing transmit beamforming. On the other hand, the controller 40 or the steering matrix calculation unit 48 within the receiver 16 may determine the steering matrix for use in the beamforming network 24 of the transmitter 12, and may then transmit this steering matrix to the transmitter 12. Thus, the steering matrix calculation unit 48 may utilize techniques, described subsequently, for generating transmit steering matrices to be applied by the beamforming network 24 of the transmitter 12.

The receiver 116 may compute the steering matrix to be used by the transmitter 112 based on the CSI developed by the receiver 116, and may send the actual steering matrix to the transmitter 112 to be used in transmitting information to the receiver 16. On the other hand, the steering matrix for the transmitter beamforming network 24 of FIG. 1 may be calculated by the steering matrix calculation unit 28 within the transmitter 12 based on the CSI provided and sent back from the receiver 16 to the transmitter 12 during the sounding process. As another alternative, the steering matrix for the transmitter beamforming network 24 of FIG. 1 may be calculated by the steering matrix calculation unit 28 within the transmitter 12 based on the CSI associated with the reverse channel (i.e., from the receiver 16 to the transmitter 12).

Figure 3:
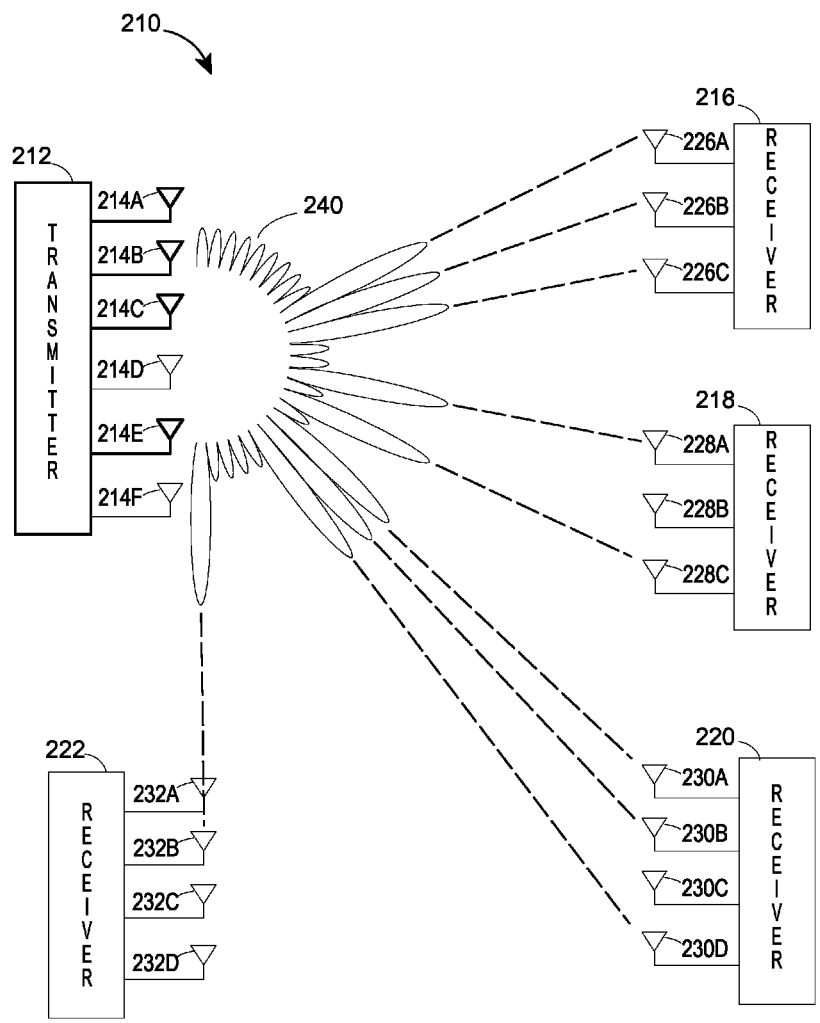
FIG. 3 is a block diagram illustrating a transmit gain pattern for wireless communications between a single transmitter and multiple receivers implemented using transmit beamforming.

Of course, the techniques described herein are not limited to being used in a transmitter of a MIMO communication system communicating with a single receiver of the MIMO communication system, but can additionally be applied when a transmitter of a MIMO communication system is communicating with multiple receivers, each of which has one or more receiver antennas associated therewith. For example, FIG. 3 illustrates a MIMO system 210 in which a single transmitter 212 having multiple (in this example six) transmitter antennas 214A-214F transmits to multiple receivers 216, 218, 220 and 222, each having multiple receiver antennas 226A-226C, 228A-228C, 230A-230D, and 232A-232D, respectively. While shown in this example as including three or four receiver antennas, any or all of the receivers 216, 218, 220, 222 of FIG. 3 could include different numbers of receiver antennas, including only a single receiver antenna if so desired. In any event, as illustrated by the transmit gain pattern 240 illustrated in FIG. 3, the steering matrix calculated and used by the transmitter 212 may be formed using CSI generated by one or more of the receivers 216, 218, 220 and 222 and/or using CSI generated based on one or more reverse channels between the transmitter 212 and the receivers 216, 218, 220 and 222.

In one example, the transmit steering matrix may be calculated or determined using steering information generated by each of the receivers 216, 218, 220 and 222, so that, as shown by the transmit gain pattern 240, a high gain lobe is directed to at least one receiver antenna of each of the receivers 216, 218, 220, 222 at the same time. However, the steering matrix need not necessarily produce a high gain lobe directed to all of the receiver antennas of each of the receivers 216, 218, 220, 222, and not necessarily to all of the receiver antennas for any particular one of the receivers 216, 218, 220, 222. Thus, as illustrated in FIG. 3, the steering matrix for the transmitter 212 is determined in such a manner that a separate high gain lobe is directed to each of the receiver antennas 226A, 226B, 226C, 228A, 228C, 230A, 230B and 230D. However, due to the physical location of the receiver 222 and its antennas with respect to the transmitter 212, a single high gain lobe is directed to the receiver antennas 232A-232D, resulting in a single high gain lobe in the transmit gain pattern 240 directed to all of these receiver antennas.

In another example, the transmit steering matrix may be calculated or determined using CSI information associated with reverse channels between the transmitter 212 and each of the receivers 216, 218, 220 and 222.

On the other hand, the transmitter 212 may develop a different steering matrix for each of the receivers 216, 218, 220 and 222 using steering information generated by the different receivers, and may use those steering matrices to beamform to the separate or different receivers at different times or using different channels, e.g., OFDM channels, of the system. As another example, the transmitter 212 may develop a different steering matrix for each of the receivers 216, 218, 220 and 222 using CSI information associated with reverse channels between the transmitter 212 and each of the receivers 216, 218, 220 and 222.

While, in many cases, it will be desirable to beamform in such a way to direct a high gain lobe to at least one receiver antenna from each receiver, it may not be necessary to implement this requirement in all cases. For example, a particular receiver may be in a direct line of sight from the transmitter to another receiver and therefore may be disposed in a high gain region of the transmitter and may thus adequately receive the transmitted signals from the transmitter without utilizing steering information generated by that receiver. As another example, a particular receiver may be disposed in a low gain region associated with the transmitter, but may be disposed relatively close to the transmitter so that the particular receiver adequately receives the signals transmitted by the transmitter without utilizing steering information generated by that receiver. Of course, if desired, the number and location (identity) of the receivers used in calculating the transmit steering matrix can be determined in any manner, including by trial and error, in determining an acceptable or optimal steering matrix using steering information generated by more than one receiver. Still further, while the maximum gains of the high gain lobes of each of the transmit gain patterns shown in FIGS. 2 and 3 are shown as being the same, the steering matrix calculation units 28 and 48 may develop steering matrices which produce high gain lobes with differing maximum gains.

Referring again to FIG. 1, the beamforming network 24 applies the steering matrix to the modulated signals to thereby perform beamforming via the transmitter antennas 14A-14N. In a MIMO system, a beamformed or steered signal that is received by a receiver may be represented as:

$$y = HQs + n \qquad \text{(Equation 1)}$$

where:
y is an $N_{Rx} \times 1$ received signal vector;
$N_{Rx}$ is a number of receive antennas;
n is an $N_{Rx} \times 1$ additive noise vector;
s is an $N_{SS} \times 1$ transmitted signal vector;
$N_{SS}$ is a number of spatial streams;
H is an $N_{Rx} \times N_{Tx}$ matrix indicative of a MIMO channel;

$N_{Tx}$ is a number of transmit antennas; and
$Q$ is an $N_{Tx} \times N_{SS}$ steering matrix.

In communication systems that utilize OFDM, Equation 1 may correspond to each sub-carrier or tone of the OFDM system, or to each of a plurality of groups of sub-carriers or tones. For example, in a MIMO-OFDM system, a beamformed or steered signal that is received by a receiver may be represented as:

$$Y_k = H_k Q_k s_k + n_k \qquad \text{(Equation 2)}$$

where:

$Y_k$ is an $N_{Rx} \times 1$ received signal vector for a $k^{th}$ sub-carrier or tone, or for a $k^{th}$ group of sub-carriers or tones;

$n_k$ is an $N_{Rx} \times 1$ additive noise vector for the $k^{th}$ sub-carrier or $k^{th}$ group of sub-carriers;

$s_k$ is an $N_{SS} \times 1$ transmitted signal vector for the $k^{th}$ sub-carrier or $k^{th}$ group of sub-carriers;

$H_k$ is an $N_{Rx} \times N_{Tx}$ matrix indicative of a MIMO channel for the $k^{th}$ sub-carrier or $k^{th}$ group of sub-carriers; and $Q_k$ is an $N_{Tx} \times N_{SS}$ spatial steering matrix for the $k^{th}$ sub-carrier or $k^{th}$ group of sub-carriers.

After the steering matrix has been applied to the modulated signals, the signals may be provided to a plurality of power amplifiers (PAs) (not shown in FIG. 1), each PA corresponding to a different one of the antennas 14. In a typical MIMO transmitter, each PA is driven at a desired maximum output power level. The desired maximum output power level may be a level at which output power is maximized and distortion remains at or below a defined, acceptable level, or the desired maximum output power level may be a level at which one or more other performance criteria are met. Each PA may be associated with the same or a different desired maximum output power level.

Figure 4:
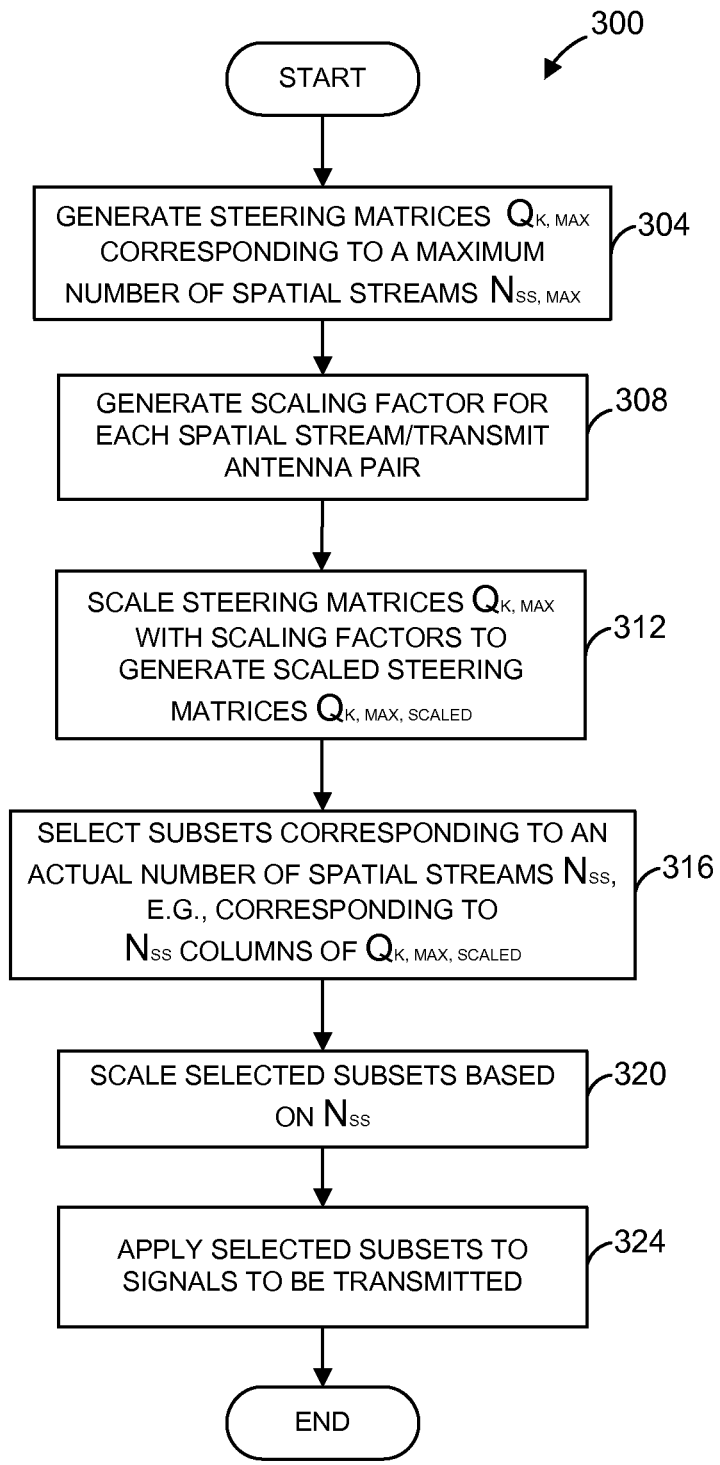
FIG. 4 is a flow diagram of an example method of generating and applying a steering matrix for transmit beamforming.

FIG. 4 is a flow diagram of an example method 300 for generating and applying a steering matrix for transmit beamforming. Compared to traditional steering matrix calculation techniques, the method 300 may utilize less system resources in at least some implementations. For example, with a method such as the method 300, a steering matrix need not be completely recalculated when the system changes the number of spatial streams that are utilized. The method 300 may be implemented at least partially by the steering matrix calculator 28 and/or the steering matrix calculator 48 and the beamforming network 24 of FIG. 1, for example, and will be described with reference to FIG. 1 for ease of explanation. Of course, the method 300 may be implemented by a system other than the system 10 of FIG. 1. Similarly, the system 10 may implement a method different than that of FIG. 4.

At block 304, one or more transmit steering matrices corresponding to a maximum number of spatial streams $N_{SS_{max}}$ that can be transmitted by the transmitter 12 (i.e., one or more "transmit steering matrices $Q_{k,max}$", where k denotes a k-th sub-carrier or group of sub-carriers, and where k varies from 1 to $N_{SC}$, where $N_{SC}$ is the maximum number of sub-carriers or groups of sub-carriers) is generated. The maximum number of spatial streams $N_{SS_{max}}$ may correspond to the maximum of $N_{Rx}$ and $N_{Tx}$, for example. Each transmit steering matrix $Q_{k,max}$ is an $N_{Tx} \times N_{SS_{max}}$ matrix. The one or more transmit steering matrices $Q_{k,max}$ may be calculated by the steering matrix calculator 28 of the transmitter 12, for example. Alternatively, the one or more maximum transmit steering matrices $Q_{k,max}$ may be calculated by the steering matrix calculator 48 of the receiver 16. If calculated by the steering matrix calculator 48 of the receiver 16, the receiver 16 may transmit the one or more maximum transmit steering matrices $Q_{k,max}$ to the transmitter 12. The one or more maximum transmit steering matrices $Q_{k,max}$ may be stored in the memory 21 or the memory 41, for example. The one or more maximum transmit steering matrices $Q_{k,max}$ may be generated using any suitable technique including currently known techniques.

At block 308, a scaling factor for each spatial stream/transmit antenna pair is generated. Each scaling factor is calculated using coefficients in each of the one or more transmit steering matrices $Q_{k,max}$ that correspond to the spatial stream/transmit antenna pair. Additionally, each scaling factor may be calculated using a maximum desired output power threshold $\hat{P}_t$ of the corresponding t-th transmit antenna. Generally, but not necessarily, the maximum output power threshold $\hat{P}_t$ may be predetermined. In one implementation, the scaling factor $\alpha_{t,i}$ for the t-th transmit antenna and the i-th spatial stream can be calculated according to:

$$\alpha_{t,i} = \sqrt{\frac{\frac{1}{N_{SC}} \sum_{k=1}^{N_{SC}} |Q_{k,\max}(t,i)|^2}{\hat{P}_t}} \qquad \text{(Equation 3)}$$

where:

t varies from 1 to $N_{Tx}$;

i varies from 1 to $N_{SS_{max}}$;

$N_{SC}$ is the number of sub-carriers or groups of sub-carriers; and $Q_{k,max}(t,i)$ is the coefficient corresponding to the t-th row and the i-th column of the transmit steering matrix $Q_{k,max}$. In another implementation, $\hat{P}_t$ may denote ratios of maximum output power thresholds of the transmit antennas. For example, if all of the transmit antennas have identical maximum output power thresholds, then $\hat{P}_t = 1$ for all transmit antennas. In this example, a separate module may control the actual scaling from modulated transmitted symbols to signals transmitted by each transmit antenna, and the block 308 may determine only a relative scaling factor between transmit antennas. In another example where all the transmit antennas do not have identical maximum output power thresholds, $\hat{P}_t$ may be a ratio of a maximum output power threshold of the t-th antenna to a maximum output power threshold of a transmit antenna with the largest maximum output power threshold.

The scaling factor $\alpha_{t,i}$ may be computed for each spatial stream/transmit antenna pair, e.g., for t=1, 2, ..., $N_{Tx}$ and i=1, 2, ..., $N_{SS_{max}}$. The computed scaling factors $\alpha_{t,i}$ may be stored, for example, in the memory 21 and/or 41 of FIG. 1 or some other memory such as a memory (not shown) included in the steering matrix calculator 28 and/or 48. The scaling factors $\alpha_{t,i}$ are independent of a number of spatial streams that are actually being transmitted or utilized. Thus, when the number of spatial streams changes, the computed scaling factors $\alpha_{t,i}$ remain valid and need not be re-calculated.

In some embodiments, the scaling factors $\alpha_{t,i}$ may be calculated by the steering matrix calculator 28 of the transmitter 12. In other embodiments, the scaling factors $\alpha_{t,i}$ may be calculated by the steering matrix calculator 48 of the receiver 16. For example, the steering matrix calculator 48 may calculate the transmit steering matrix $Q_{k,max}$ and may receive the maximum output power threshold $\hat{P}_t$ from the transmitter 12. Then, using the transmit steering matrix $Q_{k,max}$ and the received maximum output power threshold $\hat{P}_t$, the steering matrix calculator 48 may calculate the scaling factors $\alpha_{t,i}$. In yet other embodiments, the scaling factors $\alpha_{t,i}$ may be generated by both the steering matrix calculator 48 of the receiver 16 and by the steering matrix calculator 28 of the transmitter 12. In particular, the steering matrix calculator 48 of the receiver 16 may generate intermediate values and transmit the intermediate values to the transmitter 12. Then, the steering matrix calculator 28 may utilize the intermediate values to calculate the scaling factors $\alpha_{t,i}$. As just one example, the steering matrix calculator 48 of the receiver 16 may calculate the maximum transmit steering matrix $Q_{k,max}$, and then calculate an intermediate value such as, for example, $$\frac{\sum_{k=1}^{N_{SC}} |Q_{k,\max}(t,i)|^2}{N_{SC}}$$

for each t and i. The receiver 16 may then transmit the intermediate values $$\frac{\sum_{k=1}^{N_{SC}} |Q_{k,\max}(t,i)|^2}{N_{SC}}$$

for each t and i to the transmitter 12, and the steering matrix calculator 28 of the transmitter 12 may then complete the calculation of the scaling factors $\alpha_{t,i}$ using the intermediate values received from the receiver 16. The one or more scaling factors $\alpha_{t,i}$ and/or intermediate values may be stored in the memory 21 and/or the memory 41, for example.

At block 312, the one or more transmit steering matrices $Q_{k,max}$ are scaled using the scaling factors $\alpha_{t,i}$ to generate one or more scaled transmit steering matrices $Q_{k,max,scaled}$. In one example, each coefficient $Q_{k,max}(t,i)$ for the one or more transmit steering matrices $Q_{k,max}$ is divided by the corresponding scaling factor $\alpha_{t,i}$. The one or more scaled transmit steering matrices $Q_{k,max,scaled}$ may be generated by the steering matrix calculator 28 of the transmitter 12 or the steering matrix calculator 48 of the receiver 16. If the one or more scaled transmit steering matrices $Q_{k,max,scaled}$ are generated by the steering matrix calculator 48 of the receiver 16, the receiver 16 may transmit the one or more scaled maximum transmit steering matrices $Q_{k,max,scaled}$ to the transmitter 12. If the one or more scaled transmit steering matrices $Q_{k,max,scaled}$ are generated by the steering matrix calculator 28 of the transmitter 12, one or both (or none) of the transmit steering matrices $Q_{k,max}$ and the scaling factors $\alpha_{t,i}$ may be received from the receiver 16. For example, the transmitter 12 may receive the one or more transmit steering matrices $Q_{k,max}$ from the receiver 14, and the steering matrix calculator 28 of the transmitter may generate the scaling factors $\alpha_{t,i}$. Then, the steering matrix calculator 28 may scale the one or more transmit steering matrices $Q_{k,max}$ using the scaling factors $\alpha_{t,i}$ to generate the one or more scaled transmit steering matrices $Q_{k,max,scaled}$. The one or more scaled maximum transmit steering matrices $Q_{k,max,scaled}$ may be stored in the memory 21 and/or the memory 41, for example. Each of the one or more scaled transmit steering matrices $Q_{k,max,scaled}$ comprises a plurality of coefficients, which may be referred to as steering coefficients.

At block 316, if the actual number of spatial streams $N_{SS}$ to be transmitted is less than or equal to $N_{SS_{max}}$, a subset of each of the one or more scaled transmit steering matrices $Q_{k,max,scaled}$ is selected, the selected subset corresponding to $N_{SS}$ spatial streams. As will be explained further below, the subset of each of the one or more scaled transmit steering matrices $Q_{k,max,scaled}$ will be applied to the $N_{SS}$ spatial streams for beamforming. In one implementation, the selected subset of each of the one or more scaled transmit steering matrices $Q_{k,max,scaled}$ may be $N_{SS}$ columns of each of the one or more scaled transmit steering matrices $Q_{k,max,scaled}$. For example, if $N_{SS}$ is two and $N_{SS_{max}}$ is greater than two, two columns of coefficients, such as the first two columns or some other set of two columns, of each of the one or more scaled transmit steering matrices $Q_{k,max,scaled}$ may be selected. In some embodiments, the $N_{SS}$ columns of each of the one or more scaled transmit steering matrices $Q_{k,max,scaled}$ may be selected to form one or more corresponding selected subset steering matrices $\hat{Q}_k$. For instance, in the aforementioned example, one or more corresponding selected subset steering matrices $\hat{Q}_k$ of dimension $N_{Tx} \times 2$ may be formed. It is to be understood, however, that forming selected subset steering matrices $\hat{Q}_k$ is not required. For example, selected columns of the scaled maximum steering matrix $Q_{k,max,scaled}$ may be applied by the beamforming network 24 without forming matrices $\hat{Q}_k$. In this embodiment, an indicator of the selected subset of each of the one or more scaled transmit steering matrices $Q_{k,max,scaled}$ (e.g., selected columns of each of $Q_{k,max,scaled}$) may be generated by the steering matrix calculator 28 or 48 and stored in the memory 21. The block 316 may be implemented by the steering matrix calculator 28 and/or the steering matrix calculator 48, for example. The one or more corresponding selected subset steering matrices $\hat{Q}_k$ or an indicator of the one or more selected subsets of the one or more scaled transmit steering matrices $Q_{k,max,scaled}$ may be stored in the memory 21, for example.

At block 320, the selected subsets of the one or more scaled transmit steering matrices $Q_{k,max,scaled}$ (whether or not in the form of the matrices $\hat{Q}_k$) are scaled using a scalar value corresponding to actual number of spatial streams $N_{SS}$ to be transmitted. If subset steering matrices $\hat{Q}_k$ are formed, one or more scaled selected subset steering matrices $\hat{Q}_{k,scaled}$ may be generated. For example, each of the selected subset steering matrices $\hat{Q}_k$ may be scaled by the scalar value $$\frac{1}{\sqrt{N_{ss}}}$$

to generate $\hat{Q}_{k,scaled}$. If matrices $\hat{Q}_k$ are not formed, the scaling may be applied by the beamforming network 24, for example. The scalar values $$\frac{1}{\sqrt{N_{ss}}}$$

for different values of $N_{SS}$ may be calculated once and stored in a memory such as the memory 21. The block 320 may be implemented by the steering matrix calculator 28 or the beamforming network 24, for example, and the one or more scaled selected subset steering matrices $\hat{Q}_{k,scaled}$, if generated, may be stored in the memory 21. In another example, the block 320 may be implemented by the steering matrix calculator 48, and the one or more scaled selected subset steering matrices $\hat{Q}_{k,scaled}$ or the one or more scaled selected subsets of the scaled transmit steering matrices $Q_{k,max,scaled}$ may be stored in the memory 41 and may be sent to the transmitter 12.

The block 320 may be omitted from the method 300 if the symbols to be transmitted are appropriately scaled, for example.

At the block 324, the scaled selected subsets of the scaled transmit steering matrices $Q_{k,max,scaled}$ (whether or not in the form of the matrices $\hat{Q}_k$) may be applied to spatial streams to be transmitted by the transmitter 12. The scaled selected subsets of the scaled transmit steering matrices $Q_{k,max,scaled}$ may correspond to a desired gain and phasing of the signals to affect a production of high gain lobes of desired magnitudes and in desired directions. The scaled subsets of the scaled transmit steering matrices $Q_{k,max,scaled}$ may be applied to the signals to be transmitted using any suitable technique including currently known techniques used for applying steering matrices to the signals. In one embodiment, the beamforming network 24 may apply the one or more matrices $\hat{Q}_{k,scaled}$ to the spatial streams to be transmitted. In another embodiment, the beamforming network 24 may be configured to apply only selected subsets of the transmit steering matrices $Q_{k,max,scaled}$. In this embodiment, the steering matrix calculator 28, the memory 21 etc., may provide to the beamforming network 24 an indicator of the selected subsets of the scaled transmit steering matrices $Q_{k,max,scaled}$ to be applied (e.g., selected columns). Also in this embodiment, the beamforming network 24 may be configured to apply the scaling value $$\frac{1}{\sqrt{N_{ss}}}$$

to the selected subsets of the scaled transmit steering matrices $Q_{k,max,scaled}$.

Each of the one or more scaled transmit steering matrices $Q_{k,max,scaled}$ may be referred to as being "spatial stream invariant" because at least a subset of the transmit steering matrix $Q_{k,max,scaled}$ may be utilized even if the number of spatial streams changes (albeit coefficients of the transmit steering matrix $Q_{k,max,scaled}$ may be scaled by a scalar value corresponding to the number of spatial streams prior to being applied by the beamforming network).

As the scaled selected subsets are applied to the spatial streams to be transmitted, each t-th transmit antenna may be ensured to be transmitting at or below a corresponding maximum output power threshold $\hat{P}_t$. In particular, each coefficient in the scaled selected subsets is scaled by the scaling factor $\alpha_{t,i}$ and thus, as shown in Equation 3, is normalized by $\hat{P}_t$. In this manner, the method 300 may ensure operation of the transmit antennas at essentially distortion-free, maximum output power thresholds. The transmitter 12 is no longer required to take extra steps to calculate, compare, and adjust signal energies across an entire set of transmit antennas, but instead may simply apply the appropriate coefficients from the scaled selected subsets of $Q_{k,max,scaled}$ to condition signals so that they are transmitted at or below the desired maximum output power threshold.

Figure 5:
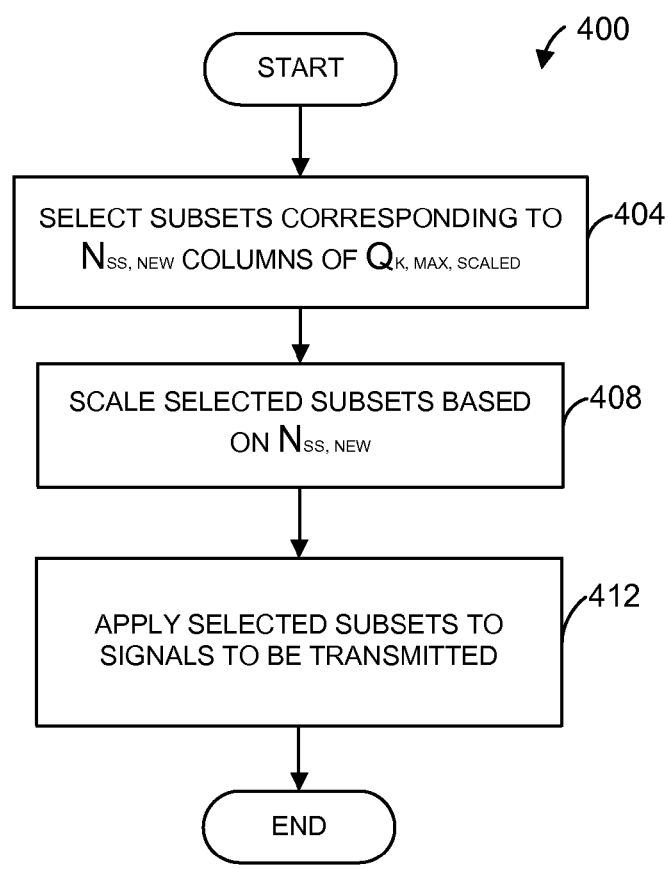
FIG. 5 is a flow diagram of an example method of determining and applying a steering matrix for beamforming.

FIG. 5 is a flow diagram of an example method 400 for generating and applying a steering matrix for transmit beamforming. The method 400 may be implemented by the steering matrix calculator 28 and/or 48 and the beamforming network 24 of FIG. 1, for example, and will be described with reference to FIG. 1 for ease of explanation. Of course, the method 400 may be implemented by a system other than the system 10 of FIG. 1. Similarly, the system 10 may implement a method different than that of FIG. 5.

The method 400 may be implemented when the number of spatial streams $N_{SS}$ has been changed to a new actual number of spatial streams $N_{SS_{new}}$ for transmission. The number of spatial streams $N_{SS}$ and the new actual number of spatial streams $N_{SS_{new}}$ may each be less than or equal to a maximum number of spatial streams able to be transmitted between a transmitter and a receiver. The method 400 assumes that one or more scaled, maximum transmit steering matrices $Q_{k,max,scaled}$ have been calculated prior to the start of the method 400. For example, the one or more scaled, maximum transmit steering matrices $Q_{k,max,scaled}$ may have been calculated as described with respect to FIG. 4 or using another suitable method.

At block 404, $N_{SS_{new}}$ columns of each of the one or more scaled maximum transmit steering matrices $Q_{k,max,scaled}$ are selected. In some embodiments, the $N_{SS_{new}}$ columns may be selected to form one or more corresponding selected subset steering matrices $\hat{Q}_k$ of dimension $N_{Tx} \times N_{SS_{new}}$. For example, if $N_{SS_{new}}$ is two and $N_{SS_{max}}$ is greater than two, two columns, such as the first two columns or some other set of two columns, of each of the one or more scaled maximum transmit steering matrices $Q_{k,max,scaled}$ may be selected to form one or more corresponding selected subset steering matrices $\hat{Q}_k$ of dimension $N_{Tx} \times 2$. In other embodiments, the $N_{SS_{new}}$ columns may be selected and an indicator of the selected columns may be generated. The block 404 may be implemented by the steering matrix calculator 28 and/or 48. The one or more corresponding selected subset steering matrices $\hat{Q}_k$ or indicator of the selected subsets may be stored in the memory 21 and/or 41, for example.

At block 408, the selected subsets (whether or not in the form of the matrices $\hat{Q}_k$) are scaled using a scalar value corresponding to the new actual number of spatial streams $N_{SS_{new}}$ to be transmitted. If the selected subsets are the selected subset steering matrices $\hat{Q}_k$, one or more scaled selected subset steering matrices $\hat{Q}_{k,scaled}$ may be generated. For example, each of the selected subset steering matrices $\hat{Q}_k$ may be scaled by the scalar value $$\frac{1}{\sqrt{N_{ss_{new}}}}$$

to generate $\hat{Q}_{k,scaled}$. If the matrices $\hat{Q}_k$ are not generated, the scaling factor $$\frac{1}{\sqrt{N_{ss_{new}}}}$$

may be applied by the beamforming network 24. The scalar values $$\frac{1}{\sqrt{N_{ss_{new}}}}$$

for different values of $N_{SS_{new}}$ may be calculated once and stored in a memory such as the memory 21 and/or 41. The block 408 may be implemented by the steering matrix calculator 28, for example, and one or more scaled selected subset steering matrices $\hat{Q}_{k,scaled}$ may be stored in the memory 21. In another example, the block 408 may be implemented by the steering matrix calculator 48, and one or more scaled selected subsets of coefficients of the $\hat{Q}_{k,scaled}$ may be stored in the memory 41 and may be sent to the transmitter 12. In yet another example, the block 408 may be implemented at least partially by the beamforming network 24.

The block 408 may be omitted if the symbols to be transmitted are appropriately scaled.

At the block 412, the scaled selected subsets (whether or not in the form of the matrices $\hat{Q}_k$) may be applied to spatial streams to be transmitted by the transmitter 12. The scaled selected subsets may correspond to a desired gain and phasing of the signals provided to the antennas 14A-14N to effect a production of high gain lobes of desired magnitudes and in desired directions. The scaled selected subsets may be applied to the signals to be transmitted using any suitable technique including currently known techniques used for applying steering matrices to signals to be transmitted. In just one embodiment, the beamforming network 24 may apply the scaled selected subsets to the spatial streams to be transmitted. The block 412 may be implemented similar to the block 324 of FIG. 4.

By determining scaling factors based on spatial stream/transmit antenna pairs and applying the scaling factors to a steering matrix that assumes the number of streams is maximized, steering matrices for lower numbers of spatial streams can be easily formed. A MIMO beamforming system using such techniques may consume significantly less resources (e.g., number of calculations, processing time and/or memory) when determining steering matrices upon a change in the number of spatial streams being transmitted occurring as compared to standard steering matrix computation approaches. These standard approaches generally require a steering matrix to be completely recalculated each time the number of spatial streams changes. This recalculation consumes precious system resources, especially when a high number of sub-carriers are employed. Additionally, race conditions are possible due to the time required for such recalculations.

Furthermore, with at least some techniques in the present disclosure, the scaling factors may be determined in a manner such that resultant power outputs at the transmit antennas may be ensured to be less than or equal to optimal power outputs. A MIMO beamforming system using such techniques may ensure suitable resultant power outputs simply by applying appropriately scaled steering coefficients to signals to be transmitted. In contrast, standard approaches for ensuring acceptable power output levels generally require extra computational steps to compare and adjust signal energies across an entire set of transmit antennas.

At least some of the various blocks, operations, and techniques described above may be implemented in hardware, a processor executing firmware and/or software instructions, or any combination thereof. For instance, the steering matrix calculator 28 may be implemented in hardware, a processor executing firmware and/or software instructions, or any combination thereof. Similarly, the steering matrix calculator 48 may be implemented in hardware, a processor executing firmware and/or software instructions, or any combination thereof. Still similarly, the beamforming network 24 may be implemented in hardware, a processor executing firmware and/or software instructions, or any combination thereof. Additionally, the blocks of FIGS. 4 and 5 may be implemented in hardware, a processor executing firmware and/or software instructions, or any combination thereof.

When implemented using a processor that executes firmware and/or software instructions, the software or firmware instructions may be stored in a memory associated with the processor. More generally, the software or firmware instructions may be stored in any computer readable memory such as on a magnetic disk, an optical disk, or other storage medium, in a RAM or ROM or flash memory, processor, tape drive, etc. Likewise, the software or firmware may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware may include machine readable instructions that are capable of causing one or more processors to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions or deletions in addition to those explicitly described above may be made to the disclosed embodiments without departing from the scope of the invention.

What is claimed is:

1. A method, comprising:
scaling, at one or more integrated circuit devices, a first transmit steering matrix corresponding to a maximum number of spatial streams $N_{ss_{max}}$ that can be utilized by a first communication device when communicating with a second communication device, wherein
the first communication device comprises or is coupled to a plurality of transmit antennas, and
scaling the first transmit steering matrix comprises scaling the first transmit steering matrix using a plurality of scaling factors for spatial stream/transmit antenna pairs;
selecting, at one or more integrated circuit devices, a first number of spatial streams to utilize when transmitting information from the first communication device to the second communication device, wherein the first number of spatial streams is less than $N_{ss_{max}}$;
selecting, at one or more integrated circuit devices, a second transmit steering matrix as a subset of the first transmit steering matrix, wherein
the second transmit steering matrix corresponds to the first number of spatial streams, and
selecting the second transmit matrix comprises selecting the second transmit matrix based on the first number of spatial streams;
applying, at the first communication device, the second transmit steering matrix to signals to be transmitted by the first communication device via i) the plurality of transmit antennas, and ii) the first number of spatial streams.

2. The method of claim 1, further comprising:
after applying the second transmit steering matrix, selecting, at one or more integrated circuit devices, a second number of spatial streams to utilize when transmitting information from the first communication device to the second communication device, wherein the second number of spatial streams is (i) less than the maximum number of spatial streams $N_{ss_{max}}$ and (ii) different than the first number of spatial streams;

after selecting the second number of spatial streams, selecting, at one or more integrated circuit devices, a third transmit steering matrix as another subset of the first transmit steering matrix, wherein the third transmit steering matrix corresponds to the second number of spatial streams, and selecting the third transmit matrix comprises selecting the third transmit matrix based on the second number of spatial streams;

after selecting the third transmit steering matrix, applying, at the first communication device, the third transmit steering matrix to signals to be transmitted by the first communication device via i) the plurality of transmit antennas, and ii) the second number of spatial streams.

3. The method of claim 1, further comprising scaling, at one or more integrated circuit devices, the second transmit steering matrix using a scalar value that corresponds to the first number of spatial streams.

4. The method of claim 3, wherein the scalar value is $$\frac{1}{\sqrt{N_{SS}}},$$

wherein $N_{ss}$ is the first number of spatial streams.

5. The method of claim 1, further comprising generating the plurality of scaling factors based on the elements of the transmit steering matrix.

6. The method of claim 5, wherein each scaling factor is generated based on $$\sum_{k=1}^{N_{SC}} |Q_{k,max}(t, i)|^2,$$

wherein:
k is an index of a sub-carrier or a group of sub-carriers,
$N_{SC}$ is a number of sub-carriers or groups of sub-carriers, and
$Q_{k,max}(t, i)$ is an element of the first transmit steering matrix corresponding to a t-th transmit antenna, i-th spatial stream pair.

7. The method of claim 6, wherein the each scaling factor is generated according to $$\alpha_{t,i} = \sqrt{\frac{1}{N_{SC}} \frac{\sum_{k=1}^{N_{SC}} |Q_{k,max}(t, i)|^2}{\hat{P}_t}}$$

wherein
$\alpha_{t,i}$ is a scaling factor corresponding to the t-th transmit antenna, i-th spatial stream pair, and
$\hat{P}_t$ is one of
a ratio of a maximum output power threshold of the t-th transmit antenna to a maximum output power threshold of a particular transmit antenna of the plurality of transmit antennas having a largest maximum output power threshold, or the maximum output power threshold of the t-th transmit antenna.

8. The method of claim 5, wherein the plurality of scaling factors are generated further based on respective maximum output power thresholds for respective transmit antennas among the plurality of transmit antennas.

9. A system, comprising:
one or more integrated circuit devices configured to:
scale a first transmit steering matrix corresponding to a maximum number of spatial streams $N_{ss_{max}}$ that can be utilized by a first communication device when communicating with a second communication device, wherein
the first communication device comprises or is coupled to a plurality of transmit antennas, and
scaling the first transmit steering matrix comprises scaling the first transmit steering matrix using a plurality of scaling factors for spatial stream/transmit antenna pairs,
select a first number of spatial streams to be utilized when transmitting information from the first communication device to the second communication device, wherein the first number of spatial streams is less than $N_{ss_{max}}$,
select a second transmit steering matrix as a subset of the first transmit steering matrix, wherein
the second transmit steering matrix is to be applied by the first communication device to signals to be transmitted by the first communication device via i) the plurality of transmit antennas, and ii) the first number of spatial streams, and
selecting the second transmit matrix comprises selecting the second transmit matrix based on the first number of spatial streams.

10. The system of claim 9, wherein the one or more integrated circuit devices are configured to:
apply the second transmit steering matrix to signals being transmitted by the first communication device via i) the plurality of transmit antennas, and ii) the first number of spatial streams.

11. The system of claim 9, wherein the one or more integrated circuit devices are configured to:
after the first communication device utilizes the second transmit steering matrix to transmit signals to the first communication device, select a second number of spatial streams to be utilized when transmitting information from the first communication device to the second communication device, wherein the second number of spatial streams is (i) less than the maximum number of spatial streams $N_{ss_{max}}$ and (ii) different than the first number of spatial streams;
after selecting the second number of spatial streams, select a third transmit steering matrix as another subset of the first transmit steering matrix, wherein
the third transmit steering matrix is to be applied by the first communication device to signals to be transmitted by the first communication device via i) the plurality of transmit antennas, and ii) the second number of spatial streams, and
selecting the third transmit matrix comprises selecting the third transmit matrix based on the second number of spatial streams;
after selecting the third transmit steering matrix, applying, at the first communication device, the third transmit steering matrix to signals to be transmitted by the first communication device via i) the plurality of transmit antennas, and ii) the second number of spatial streams.

12. The system of claim 11, wherein the one or more integrated circuit devices are configured to:
apply the second transmit steering matrix to signals being transmitted by the first communication device via i) the plurality of transmit antennas, and ii) the first number of spatial streams; and
apply the third transmit steering matrix to signals being transmitted by the first communication device via i) the plurality of transmit antennas, and ii) the second number of spatial streams.

13. The system of claim 9, wherein the one or more integrated circuit devices are configured to:
scale the second transmit steering matrix using a scalar value that corresponds to the first number of spatial streams.

14. The system of claim 13, wherein the scalar value is $$\frac{1}{\sqrt{N_{SS}}},$$

wherein $N_{ss}$ is the first number of spatial streams.

15. The system of claim 9, wherein the one or more integrated circuit devices are configured to generate the plurality of scaling factors based on the elements of the transmit steering matrix.

16. The system of claim 15, wherein the one or more integrated circuit devices are configured to generate the plurality of scaling factors based on:

$$\sum_{k=1}^{N_{SC}} |Q_{k,max}(t, i)|^2,$$

wherein:
k is an index of a sub-carrier or a group of sub-carriers,
$N_{SC}$ is a number of sub-carriers or groups of sub-carriers, and
$Q_{k,max}(t, i)$ is an element of the first transmit steering matrix corresponding to a t-th transmit antenna, i-th spatial stream pair.

17. The system of claim 16, wherein the one or more integrated circuit devices are configured to generate each scaling factor is generated according to $$\alpha_{t,i} = \sqrt{\frac{1}{N_{SC}} \frac{\sum_{k=1}^{N_{SC}} |Q_{k,max}(t, i)|^2}{\hat{P}_t}}$$

wherein
$\alpha_{t,i}$ is a scaling factor corresponding to the t-th transmit antenna, i-th spatial stream pair, and
$\hat{P}_t$ is one of
a ratio of a maximum output power threshold of the t-th transmit antenna to a maximum output power threshold of a particular transmit antenna of the plurality of transmit antennas having a largest maximum output power threshold, or
the maximum output power threshold of the t-th transmit antenna.

18. The system of claim 15, wherein the one or more integrated circuit devices are configured to generate the plurality of scaling factors further based on respective maximum output power thresholds for respective transmit antennas among the plurality of transmit antennas.

19. The system of claim 9, wherein the one or more integrated circuit devices are included in a network interface of the first communication device.

20. The system of claim 9, wherein the one or more integrated circuit devices are included in a network interface of the second communication device.

21. The system of claim 9, wherein:
a first integrated circuit device of the one or more integrated circuit devices is included in a first network interface of the first communication device; and
a second integrated circuit device of the one or more integrated circuit devices is included in a second network interface of the second communication device.

* * * * *